US011134028B2

(12) United States Patent
Pipes et al.

(10) Patent No.: US 11,134,028 B2
(45) Date of Patent: Sep. 28, 2021

(54) DEVICES, SYSTEMS AND METHODS FOR OPTIMIZING WORKLOAD PERFORMANCE OF USER FACING WEB APPLICATIONS DURING HIGH LOAD EVENTS

(71) Applicant: NM Nevada Trust, Las Vegas, NV (US)

(72) Inventors: Chase Michael Pipes, Irving, TX (US); Venkat Vasu Rayapudi, Irving, TX (US); Sunil Chandrashekara Shanthi, Irving, TX (US); SaiRamesh J Rao Konduri, Irving, TX (US)

(73) Assignee: NM NEVADA TRUST, Las Vegas, NV (US)

( * ) Notice: Subject to any disclaimer, the term of this patent is extended or adjusted under 35 U.S.C. 154(b) by 0 days.

(21) Appl. No.: 16/396,260

(22) Filed: Apr. 26, 2019

(65) Prior Publication Data
US 2020/0344178 A1 Oct. 29, 2020

(51) Int. Cl.
H04L 12/911 (2013.01)
G06F 16/957 (2019.01)
(Continued)

(52) U.S. Cl.
CPC ........ H04L 47/823 (2013.01); G06F 11/3616 (2013.01); G06F 11/3668 (2013.01);
(Continued)

(58) Field of Classification Search
CPC ... H04L 47/823; H04L 41/147; H04L 47/125; H04L 47/826; G06F 16/9577; G06F 11/3616; G06F 11/3668
See application file for complete search history.

(56) References Cited

U.S. PATENT DOCUMENTS 6,002,871 A * 12/1999 Duggan .............. G06F 11/3664
714/38.12
6,249,886 B1 * 6/2001 Kalkunte ............ G06F 11/3414
714/39
(Continued)

FOREIGN PATENT DOCUMENTS

WO 2014027990 2/2014

OTHER PUBLICATIONS

Chen et al. "Analytics-Driven Load Testing: An Industrial Experience Report on Load Testing of Large-Scale Systems", May 20-28, 2017, IEEE, 2017 IEEE/ACM 39th International Conference on Software Engineering: Software Engineering in Practice Track (ICSE-SEIP), pp. 1-10 (Year: 2017).*

(Continued)

Primary Examiner — Un C Cho
Assistant Examiner — Shah M Rahman
(74) Attorney, Agent, or Firm — Bryan Cave Leighton Paisner LLP

(57) ABSTRACT

Disclosed are devices, systems, apparatuses, methods, products, and other implementations for optimizing system performance of user facing web applications with load testing scripts. According to some embodiments, the system includes an analytics engine and a workload model including one or more load variables. The workload model generates a distribution of values for each of the one or more load variables. The system further includes a script engine and a load test controller that controls load generators to simulate internet traffic to a website. The load test controller determines an amount of computer resources needed to meet a high load scenario based on the performance of the system in response to the simulated internet traffic to the website.

20 Claims, 15 Drawing Sheets

(51) Int. Cl.
    *H04L 12/803*     (2013.01)
    *G06F 11/36*     (2006.01)
    *H04L 12/24*     (2006.01)

(52) U.S. Cl.
    CPC ........ *G06F 16/9577* (2019.01); *H04L 41/147* (2013.01); *H04L 47/125* (2013.01); *H04L 47/826* (2013.01)

(56) References Cited

U.S. PATENT DOCUMENTS

| | | | | |
|---|---|---|---|---|
| 6,633,878 | B1* | 10/2003 | Underwood | G06Q 10/10 |
| 8,260,893 | B1* | 9/2012 | Bandhole | G06F 9/5083 |
| | | | | 709/221 |
| 8,370,495 | B2* | 2/2013 | Jackson | G06F 9/5027 |
| | | | | 709/226 |
| 8,601,119 | B1 | 12/2013 | Vassilakis | |
| 8,904,346 | B1* | 12/2014 | Strikhalev | G06F 11/3688 |
| | | | | 717/108 |
| 9,171,086 | B1 | 10/2015 | Panda et al. | |
| 9,572,614 | B2* | 2/2017 | Calvin | A61B 17/8833 |
| 9,652,288 | B2* | 5/2017 | Jain | G06F 9/50 |
| 9,800,480 | B1* | 10/2017 | Eichler | H04L 43/50 |
| 10,002,393 | B1 | 6/2018 | Robertson et al. | |
| 10,091,076 | B2* | 10/2018 | Kieviet | H04L 67/20 |
| 10,135,709 | B1* | 11/2018 | Segel | G06F 11/30 |
| 10,606,736 | B1* | 3/2020 | Gardner | G06F 11/3006 |
| 2003/0005044 | A1* | 1/2003 | Miller | H04L 43/50 |
| | | | | 709/203 |
| 2004/0107415 | A1* | 6/2004 | Melamed | G06F 11/3684 |
| | | | | 717/124 |
| 2005/0010388 | A1* | 1/2005 | Bagchi | G06F 11/3447 |
| | | | | 703/22 |
| 2006/0039538 | A1* | 2/2006 | Minnis | H04B 17/3912 |
| | | | | 379/1.01 |
| 2006/0129892 | A1 | 6/2006 | Dianconu et al. | |
| 2006/0241906 | A1* | 10/2006 | Russell | G06F 11/3409 |
| | | | | 702/182 |
| 2007/0083630 | A1* | 4/2007 | Roth | G06F 11/3688 |
| | | | | 709/223 |
| 2007/0083631 | A1* | 4/2007 | Maccaux | G06F 11/3688 |
| | | | | 709/223 |
| 2007/0083632 | A1* | 4/2007 | Roth | H04L 43/50 |
| | | | | 709/223 |
| 2007/0083793 | A1* | 4/2007 | Roth | G06F 11/3433 |
| | | | | 714/25 |
| 2010/0313255 | A1* | 12/2010 | Khuda | G06F 16/9535 |
| | | | | 726/7 |
| 2011/0209216 | A1* | 8/2011 | Zohar | G06Q 30/02 |
| | | | | 726/22 |
| 2012/0042210 | A1* | 2/2012 | Glaser | G06F 11/3684 |
| | | | | 714/38.1 |
| 2013/0024847 | A1 | 1/2013 | Browne et al. | |
| 2014/0165040 | A1 | 6/2014 | Augustin et al. | |
| 2014/0280182 | A1* | 9/2014 | Anderson | G06F 11/3495 |
| | | | | 707/741 |
| 2015/0095703 | A1* | 4/2015 | Girmonsky | H04L 41/5009 |
| | | | | 714/25 |
| 2016/0352775 | A1* | 12/2016 | Naveh | H04L 43/50 |
| 2017/0046254 | A1* | 2/2017 | Buege | G06F 11/0709 |
| 2017/0315902 | A1* | 11/2017 | Moretto | G06F 11/3672 |
| 2018/0115463 | A1* | 4/2018 | Sinha | H04L 41/5009 |
| 2018/0262523 | A1 | 9/2018 | Gorny et al. | |
| 2018/0300221 | A1* | 10/2018 | Barbee | G06F 11/3688 |
| 2018/0365253 | A1* | 12/2018 | Francis | G06F 16/94 |
| 2019/0026382 | A1 | 1/2019 | Abrahami | |

OTHER PUBLICATIONS

Bondugula, S. K., "Implementation of Performance Engineering and Enhancing Release Services", Mar. 2016, St. Cloud State University, pp. 1-89 (Year: 2016).*

* cited by examiner

V-Neck Floral Lace Dress
$398.00
Free Shipping + Free Return $50 off $200 regular-price purchase with code FIFTY. Click for Details ~ 309
Triple Point Event + Earn Double Points on Beauty. Click for Details Which Size Fits Me ~ 308
Notify me when this is back in stock ~ 307

Select Size  > ~ 306

LIGHT BLUE >

[ - | + ]

|  | January 2, 2017 Load Test – Release 2A | January 3, 2017 Load Test – Release 2B with upgrade | January 5, 2017 Load Test – Release 3 |
|---|---|---|---|
| Time | 2:14am to 3:14 am | 4:28 pm to 5:28 pm | 2:02 am to 3:02 am |
| Error Percentage | 1.212% | 1.341% | 1.415% |
| Throughput | 465 msgs/sec | 489 msgs/sec | 397 msgs/sec |
| CPU(Host) | 51% | 68% | 44 % |
| Memory(Host) | 38% | 33% | 33% |

FIG. 6C

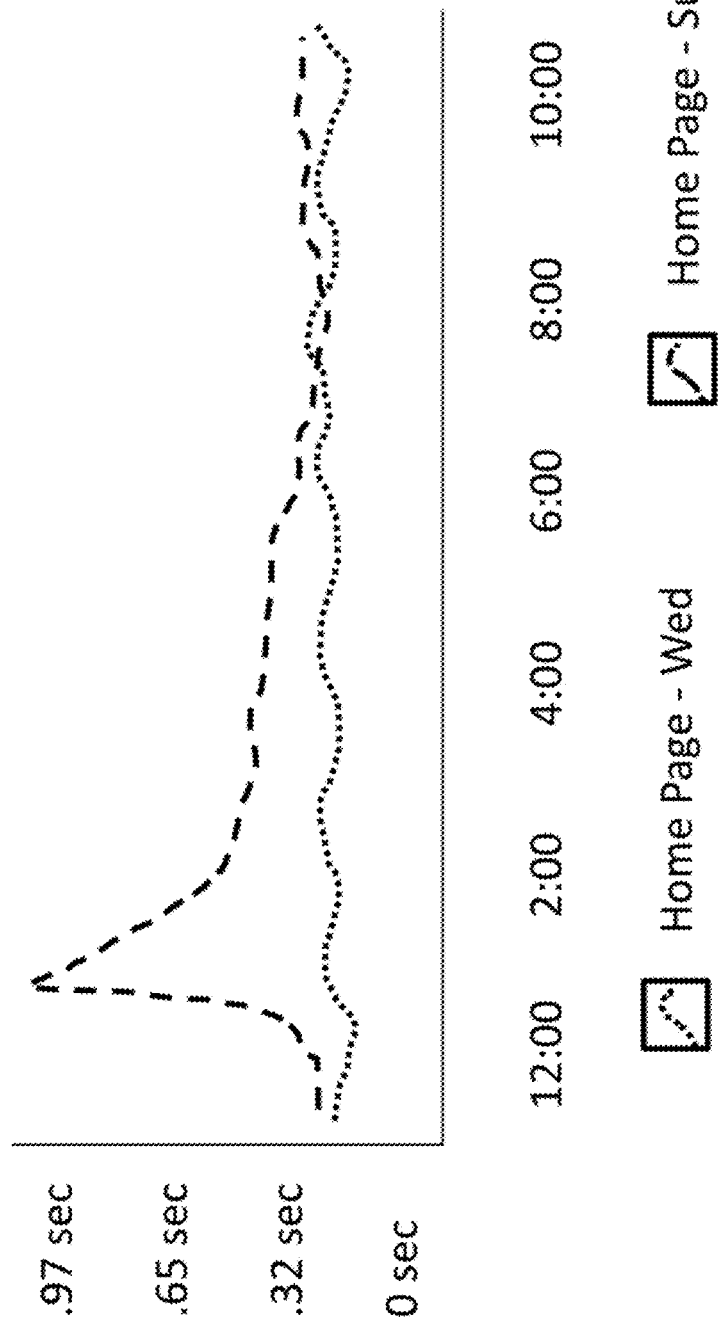

| Service Name | Status | Desired Instance | Running Instance |
|---|---|---|---|
| Promotion | Active | 41 | 41 |
| Recommendation | Active | 3 | 3 |
| Navigation | Active | 20 | 19 |

FIG. 6F

| Service | Failure Graph | # Failures | % Failure |
|---|---|---|---|
| GET_FAVORITE | | 2873 | .452 |
| GET_PRODUCT | | 21 | .009 |
| FIND_PROD_RECOMMENDATION | | 41 | .217 |

FIG. 6G

DEVICES, SYSTEMS AND METHODS FOR OPTIMIZING WORKLOAD PERFORMANCE OF USER FACING WEB APPLICATIONS DURING HIGH LOAD EVENTS

BACKGROUND

While online storefronts have become increasingly important to retail and commercial industries, scaling web systems and server architectures to meet fluctuating demands remains a challenge. In particular, web systems and server architectures can experience a surge of traffic during events such as Black Friday or Cyber Monday, when consumers tend to visit online storefronts en masse. This influx of visitors creates a high load event that strains the web system and server architecture.

Businesses that fail to anticipate and prepare for such high load events will suffer from several drawbacks. For example, a website experiencing a high load event may have poor response times, fail to process requests in a timely or efficient manner, and may even shut down. Such degradations in website performance can frustrate users and result in lost transactions.

Allocating system resources to accommodate increased demand can be exceedingly expensive, and in some cases cost prohibitive. It is therefore important to optimize the balance between the influx in demand and the amount of resources that are added to the system to meet the raised demands. Current methods for testing the load capacity of a system typically focus on validating functional testing, and therefore do not scale systems to handle live traffic for accurately testing and measuring system behavior under high load events.

Accordingly, what is needed is a system that realistically simulates the load that a website server or system architecture would experience during a high load event, and dynamically allocating computer resources to accommodate the estimated influx of load.

SUMMARY

In various embodiments, the invention provides systems, methods, and apparatuses for optimizing system performance of a website during a high load scenario using testing scripts. According to some embodiments of the invention, the methods, systems and apparatuses include initializing a workload model of a website that has one or more load variables. A distribution of values for each load variable can be generated. A script engine can be executed using the distribution of values for the load variables and generates input for a load test controller. The load test controller is executed and controls one or more load generators. When the one or more load generators are executed, they simulate internet traffic to a website during a high load event. The performance of the system is measured in response to the simulated internet traffic of the high load scenario. Computer resources can be adjusted or reallocated based on the system's performance under the high load scenario. In some embodiments, the distribution of values for the load variables is generated using an analytics engine that simulates the high load scenario using historical load data. In this way, the simulated internet traffic realistically represents the load created by high load scenarios in the past.

In some embodiments, the load variables comprise: i) a number of user sessions, ii) think time, iii) entry distribution, iv) cart size distribution, and v) session duration. Load variables can include other variables, such as a guest and registered user distribution which reflects whether a user has an account with the company and can login, or if the user is a guest user. The load test controller can control the one or more load generators based on: i) one or more user threads, ii) request pacing, and iii) data setups for each of the user threads.

In some embodiments, the high load scenario simulates internet traffic experienced by the website during a predetermined event. A predetermined event can be a holiday or other date having significance from a retail perspective.

In some embodiments, the historical load data is populated by recording samples of the one or more load variables during past events. The analytics engine can generate the distribution of values for each of the load variables by determining a worst-case scenario value of the variable from the historical load data. The analytics engine can also generate the distribution of values for the load variables using a machine learning classifier.

In some embodiments, the load generators simulate internet traffic by submitting internet requests to a production mirror. In this way, the simulation will realistically replicate the actual internet traffic experienced during a high load scenario.

In some embodiments, the system performance can be displayed with the load test controller. The system performance can be measured using several different metrics, such as website response times, error rates, or failure rates. The high load scenario can run for a timeframe that comprises one or more time periods. The amount of computer resources needed to meet the high load scenario can then be determined for each time period based on the determined system performance. In some embodiments, the time periods are one hour in length. In further embodiments, the high load scenario is an endurance test such that the timeframe comprises 8 time periods, totaling 8 hours. Such endurance tests allows for memory leaks to be identified based on the system performance.

In some embodiments, a load balancer can balance computer resources based on the determination of computer resources needed to meet the high load scenario. The load balancer can allocate additional computer resources to serve webpages that are estimated to receive high loads.

BRIEF DESCRIPTIONS OF THE DRAWINGS

The objects and features of the invention can be better understood with reference to the following detailed description and accompanying figures.

FIGS. 6A-6G show exemplary performance outputs according to embodiments of the invention.

DETAILED DESCRIPTION

The disclosed subject matter relates to a system and method for optimizing system performance of a website during a high load scenario using testing scripts.

In some embodiments of the invention, a high load scenario is an event that can cause high load on a web server or system architecture. For example, a high load event can be a date that is associated with high volumes of internet sales traffic, such as Black Friday or Cyber Monday, where consumers will visit an online storefront en masse. This increase in online traffic causes a high load on the web servers and system architecture because of, in part, the surge in web page requests. A high load event can also be a date range associated with a specific sales promotion or event. For example, in response to a Flash Sale or similar promotion, consumers may rush to the online storefront, again causing a surge in traffic and increasing the burden on the web servers and system architecture.

Figure 1:
FIG. 1 shows an exemplary system for optimizing system performance of a website during a high load scenario using testing scripts according to embodiments of the invention.

The performance of web servers and system architectures during such high load events can be characterized with one or more high load variables 101 that comprise a Workload Model 102 as shown in FIG. 1. In some embodiments of the invention, the high load variables can include: i) a number of user sessions, ii) think time distribution, iii) entry distribution, iv) cart size distribution, and v) session duration distribution. The high load variables can include other variables, Var N. For example, the high load variables can include a guest and registered user distribution which reflects whether a user has an account with the company and can login, or is a guest user, as described in more detail below. The Workload Model includes the rules and logic that interrelate the high load variables to recreate a high load scenario.

The number of user sessions can reflect the number of unique visitors that a website may receive over a time period (e.g., one hour). In some embodiments, each unique visitor results in opening a connection between the user's client device and the web server. The client device can be a desktop browser, smartphone, or mobile device as explained in more detail below. Opening and maintaining a connection between a client device and web server or system architecture consumes computer resources and adds to the system overhead. To open a connection, a web server may need to allocate a thread from a processor core, and open a port or socket on the server. The server may also create session-persistent data structures that store browser information as the user navigates through different webpages on the website, such as for example, a running history of the items that the user has viewed, saved for later, or added to their shopping cart. To maintain the session-persistent data structures, the web server may need to allocate additional memory to store the information saved in the data structure. Maintaining the session-persistent data structures also utilizes CPU processing resources, further adding to the load.

In a multi-tiered client-server architecture, where the processing, data management, and presentation functions are physically and logically separated, the load caused by maintaining persistence in memory can occur in the Data Layer. The Data Layer includes data persistence mechanisms such as, for example, databases and similar data storage systems for storing and retrieving information. When data is stored or retrieved, the website experiences an increase in load.

In some embodiments, the load can also occur in an Application Layer. The Application Layer executes application code, processes commands, makes logical decisions and evaluations, performs calculations, and moves data between other layers. The utilization of memory and CPU resources in executing these functions causes the website to experience an increase in load.

In some embodiments, the load can also occur in a Network Layer. In a tiered architecture, the layers can be distributed in distinct geographies, and coupled to each other through a communication infrastructure that includes cables, switches and routers. The more data being transmitted through the communication infrastructure, the greater the load. Load on the network Layer can also depend on the types of requests submitted by the user. For example, a user with 5 items in their shopping cart checking item availability, shipping eligibility, final price with discount, promo code eligibility, image to display, and product title for each product, will add more stress to the network than a user with less items in the shopping cart.

Thus, the greater the number of user sessions, the greater the number resources being used, and in turn, the greater the load on the web server or system architecture. For example, a website may exhibit 20,000 unique visitors per hour on a normal day, whereas the same website may exhibit 200,000 unique visitors per hour on a Black Friday, causing a surge peak in computer resources.

In some embodiments of the invention, other load variables exist that are related to the user session. For example, session-related load variables can include the total number of page views for a website, the number of page views per session, and session duration. Depending on the high load event, a user may visit a greater number of pages in a given session as compared to another normal day. For example, during a Flash Sale offering a discount on all shoes on a given website, a user may visit five different webpages offering shoes, whereas on a normal day, the user may only visit one webpage.

The session duration load variable can reflect how long a user keeps a session alive. As shown below, the session duration load variable can be expressed as a distribution:

TABLE 1

| Session Duration Distribution | Percentage |
| --- | --- |
| <=1 minute | 10 |
| 1 to 5 minutes | 30 |
| 5 to 10 minutes | 25 |
| 10 to 30 minutes | 25 |
| 30 to 60 minutes | 5 |
| 1 to 2 hours | 5 |

A user may spend twice as much time on a website during a high load event, such as for example, Black Friday, than on an otherwise normal day, in order to view all the available promotions. The longer the user is viewing the website, the longer the session-persistent data structures are being held in memory and using up system resources. For example, a user's shopping cart, which can be saved in memory on the server, will remain saved in the server's memory until the user decides to leave the website or close the browser. As a result, the longer the user's session duration, the longer the server's memory and system resources are being used, adding to the load on the web server and system architecture. In some embodiments, the values for the session duration distribution can be based on historical load data provided by an analytics engine, as explained in more detail below. In other embodiments, the distribution of session durations can be modelled statistically, as explained in more detail below.

In some embodiments, the duration can also refer to the amount of time a user spends on a particular product page. A longer session duration can result from a user spending more time interacting with a product page by clicking, hovering, and engaging with other elements on the user interface. For example, a user that has a session duration of 20 minutes will likely have interacted with the website more than a user that has a session duration of 10 minutes. The longer session duration of 20 minutes will therefore cause a greater load on the website because the user will interact with the website more during the longer session duration.

In some embodiments, the longer session duration can cause a greater load because of code that transmits asynchronous requests to the website's servers. A product page can have several such elements that consume web server resources the longer the webpage is left open. Thus the longer the viewer leaves a page open, the greater the load on the web server. For example, a webpage may have several components that asynchronously request and retrieve data from a web server as long as the webpage is open. Such asynchronous elements may be used to enable features like an interactive chat plugin that allows a user to ask a customer service representative questions about the product or company. The chat plugin can be used when it is determined that a user is struggling to make a decision based on the user's browser behavior. The chat plugin will then send and receive messages to the user, adding to the overall load of the system. A similar feature may be product alerts that display pop-up windows notifying the user about inventory status changes, such as when there are only a few available products remaining in stock. Thus, if a user has added a product to his or her shopping cart but the product is selling quickly, the system can alert the user to checkout soon, before the product is sold out.

Other features include credit card validators that validate credit card numbers in real time as the user types the number in, or coupon/discount code validators that apply coupon or discount codes to a cart. These real-time and interactive features can be facilitated utilizing, for example, AJAX web applications and jQuery libraries. The longer the webpage remains open, the more asynchronous requests are made to the web server, adding to the overall load on the web server and system architecture.

In some embodiments of the invention, the user session load variable can also characterize the types of webpages that a user will visit during a session, or website functionalities that a user will use. For example, during a user session, a user can visit a Home webpage, a Product Category webpage, a Product Detail webpage, a Search webpage, a Login webpage, a Checkout webpage, or a View Shopping Cart webpage. Similarly, during a user session, a user can use functions like Add to Cart, Inventory Lookup, or Pick Up In-Store. Other functions on a webpage include dynamically generating or displaying different images based on user interaction.

Figure 3A:
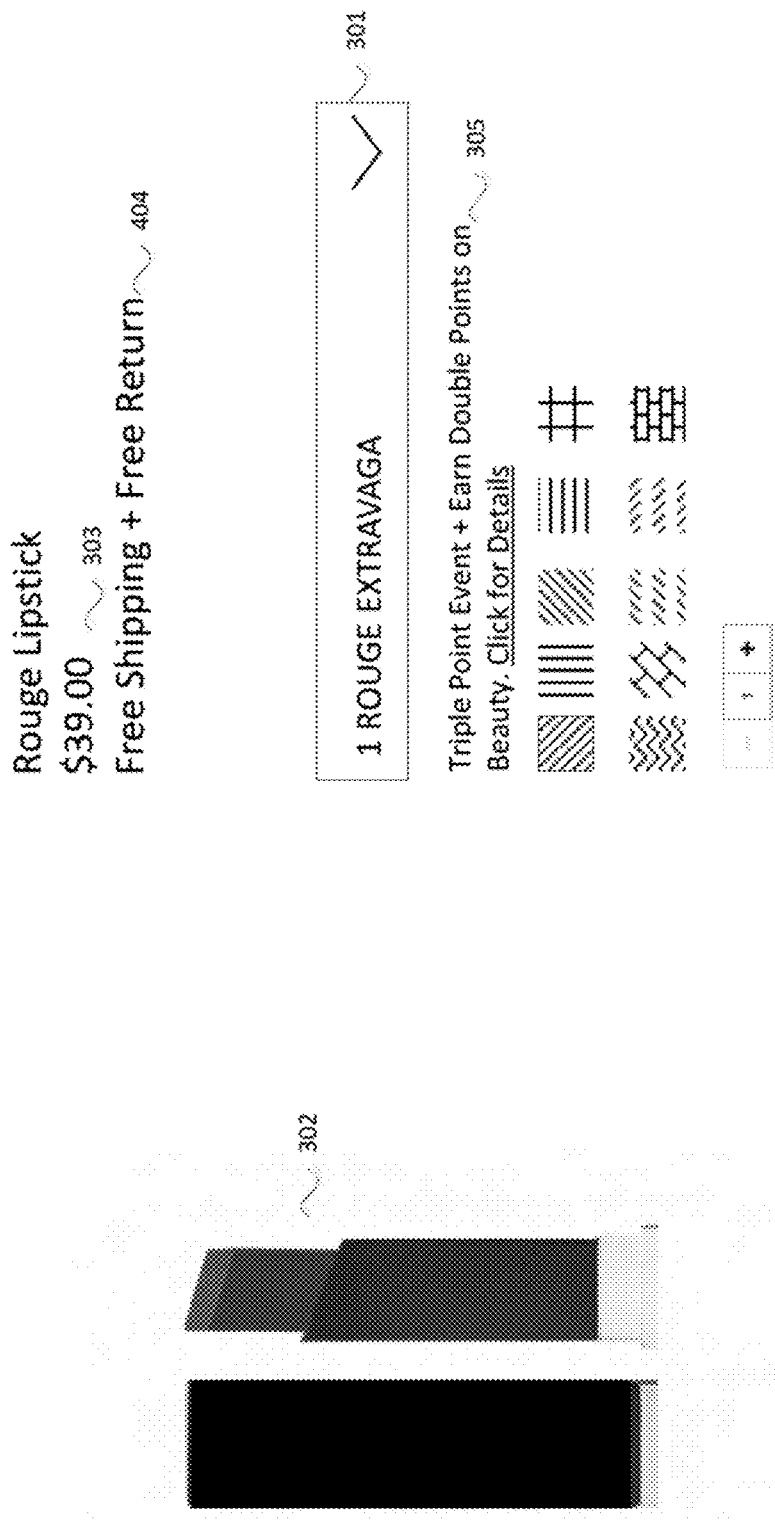
FIGS. 3A-3C show exemplary webpages used in optimizing system performance of a website during a high load scenario using testing scripts according to embodiments of the invention.
Figure 3B:
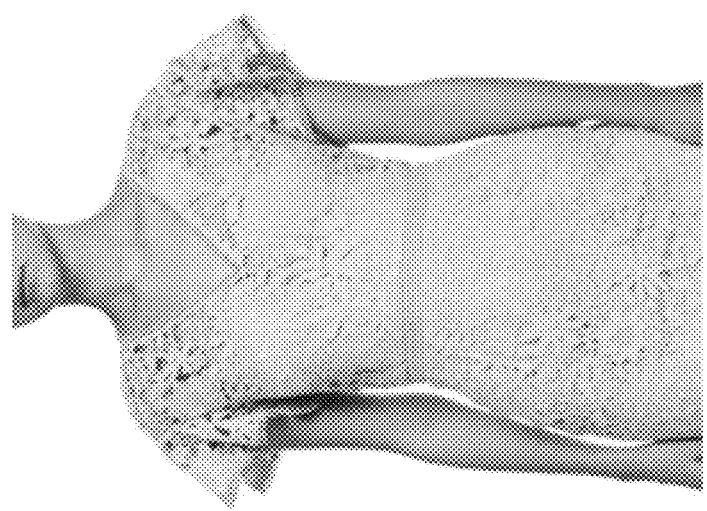

Each webpage type and the functionalities they provide can have a different impact on load. For example, in the exemplary Product Detail webpage shown in FIG. 3A, a user input 301 allows the user to select a product color. When the user input 301 is selected, the product image shown on the webpage, 302, can be dynamically generated or retrieved to display a new image with the color matched to the user selection. The creation or retrieval of information causes load at the Data and Application Layers. Similarly, the current price, 303, shipping and return availability, 304, and applicable discounts or promotions, 305 are generated by retrieving data from databases or storage systems, causing load at the Data Layer. FIG. 3B further illustrates an exemplary Product Detail webpage that may also display an input that allows a user to select a product size, 306, and may include a notification regarding the product's stock availability 307, sizing information 308, and additional stacking discounts that are applicable 309. As with FIG. 3A, these additional elements in FIG. 3B on the Product Detail webpage, each contribute to the overall load, because they are each retrieving information from the Data Layer and causing business logic to execute at the Application Layer. The Product Detail webpage shown in FIG. 3A may have a different overall load than the Product Detail webpage shown in FIG. 3B, because there are less elements causing load on the Data Layer.

Figure 3C:
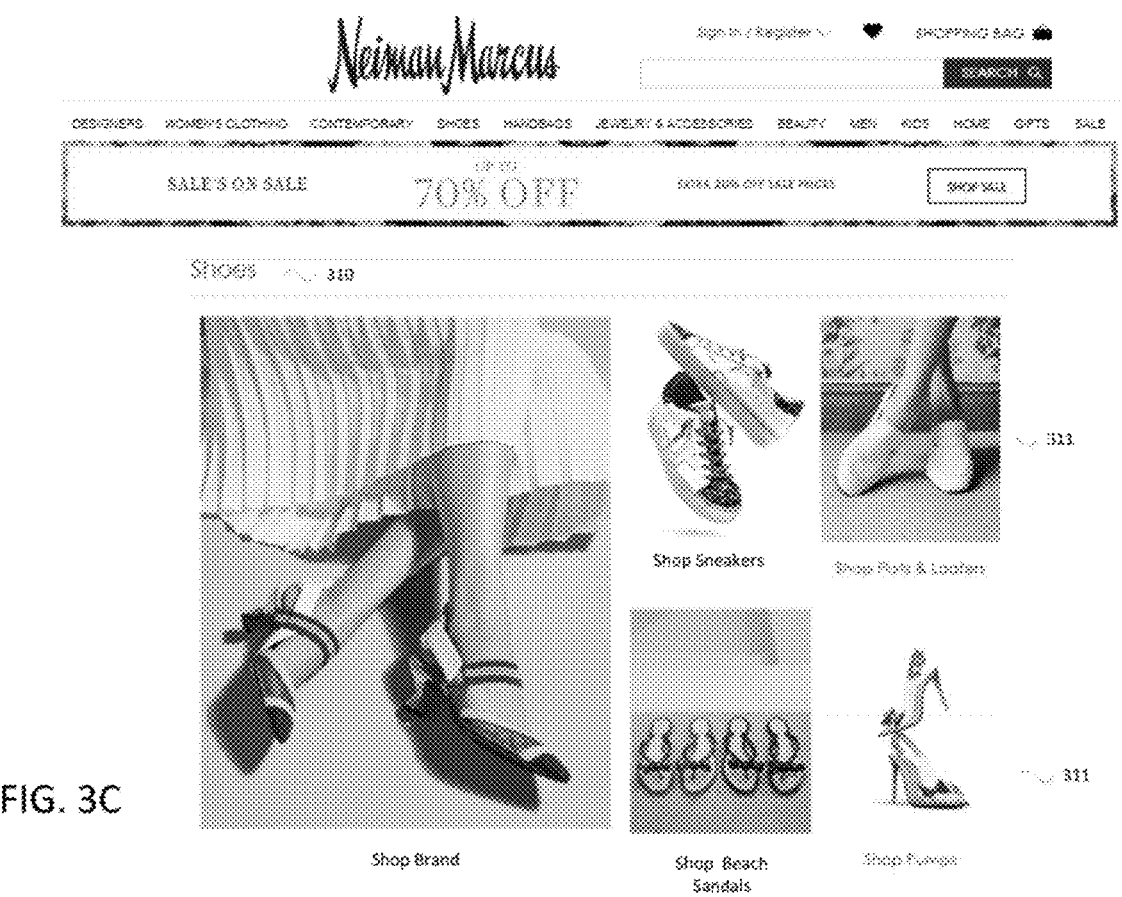

Thus, each webpage type and functionality creates a different load on the web server and system architecture. A Product Category webpage may be more resource intensive than a Product Detail webpage because the Product Category webpage may display content and information for dozens of products, whereas the Product Detail webpage focuses on a single product. As shown in FIG. 3C, an exemplary Product Category webpage for shoes 310 may include a number of product images 311 and 312 of varying size and quality.

As another example, the Search, Login, Checkout, or View Shopping Cart webpages can impact load because the details of the products in the user's shopping cart utilize data persistence mechanisms in the Data Layer. When a user adds a product to the shopping cart, for example, the details of the products in the shopping cart are saved as cookies and information matching the product residing in a database is retrieved. The information that is retrieved can be, for example, product price, product description, or similar product information. The storage and retrieving of this information adds to the overall load of the system. Further, the additional information in the shopping cart adds to the amount of data being transmitted, causing load on the Network Layer.

Similarly, a Login page adds to the overall load of the system because when a user enters his or her credentials, the validation of their username and password adds load to the system. The Search webpage likewise adds load because when a user submits a search on the website, the search engine creates load by retrieving information related to the matching products, and generating and rendering the code for the webpage containing the search results. Each page of search results requires a separate request to the website servers, and re-rendering webpages, thereby adding to the overall load. Load can also be generated when the search engine returns a large number of results that must be rendered. For example, a search that returns 200 search results may cause the system to retrieve large amounts of information from the Data Layer, thereby adding to the load.

Likewise, the Favorites webpage adds to the overall load of the system because saving a product as a Favorite or navigating to a webpage showing a user's Favorite items causing the system to interact with the Data Layer. By saving a product as a Favorite, or viewing a list of Favorite items, the system is storing and retrieving information to and from the Data Layer.

By understanding whether a user is more likely to visit one type of webpage (e.g., Product Category) than another (e.g., Product Detail) on a given high load event is helpful in determining the load that will be experienced by the system. As shown below, the webpage view load variable can be expressed as a distribution:

TABLE 2

| Webpage View Distribution | Percentage |
| --- | --- |
| Home webpage | 10 |
| Product Category webpage | 30 |
| Product Detail webpage | 25 |
| Search webpage | 10 |
| View Shopping Bag webpage | 5 |
| Login webpage | 5 |
| Checkout webpage | 15 |

In some embodiments, the values for the webpage view distribution can be based on historical load data provided by an analytics engine, as explained in more detail below. In other embodiments, the distribution of webpage views can be modelled statistically, as explained in more detail below.

The think time load variable can reflect the amount of time that a user takes before interacting with a webpage. Some types of webpages may have less think times than others. For example, a Product Detail webpage, which has a product description and other details for a user to read, may have a longer think time than a Product Category webpage, which may simply have product images and names. A user may be more likely to hover over images or scroll through a Product Category webpage than they might for a Product Detail webpage. The longer think time for the Product Detail webpage can ultimately result in a longer session duration, which as explained above, can increase the overall load on the web server or system architecture. As shown below, the think time load variable can be expressed as a distribution:

TABLE 3

| Think Time Distribution | Percentage |
| --- | --- |
| Less than 15 seconds | 10 |
| 15 to 29 seconds | 30 |
| 30 to 59 seconds | 25 |
| 1 to 3 minutes | 25 |
| 3 to 5 minutes | 5 |
| 5 to 10 minutes | 5 |

In some embodiments, the values for the think time distribution can be based on historical load data provided by an analytics engine, as explained in more detail below. In other embodiments, the distribution of think time can be modelled statistically, as explained in more detail below.

The entry distribution load variable can reflect how a user enters the website. As explained above, a website can include a number of different webpage types that a may visit, including for example, a Home webpage, a Product Category webpage, a Product Detail webpage, a Search webpage, and a Login webpage. The entry distribution load variable specifies which one of these webpages a user is most likely to visit first. For example, if a company circulates an e-mail campaign offering a promotion for a certain category of shoes, a user is most likely going to enter the company's website by first visiting that category of shoes. Under these circumstances, the entry distribution load variable will have a higher distribution on the particular Product Category webpage. Similarly, if the company launches a promotion for a particular product, the entry distribution load variable will have a higher distribution on the particular Product Detail webpage that is the subject of the promotion.

The cart size distribution load variable can reflect the amount of items that are added to a shopping cart during a user session. As shown below, the distribution load variable can be expressed as a distribution:

TABLE 4

| Cart Size Distribution | Percentage |
| --- | --- |
| 1 | 30 |
| 2 | 35 |
| 3 | 20 |
| >=4 | 15 |

As explained above, items that are added to a shopping cart can be saved by the web server in memory as session-persistent data structures. Thus, the greater the number items being added to the shopping cart, the greater the amount of memory being used by the web server, and in turn, the greater the load on the web server and system architecture. In some embodiments, the values for the cart size distribution can be based on historical load data provided by an analytics engine, as explained in more detail below. In other embodiments, the distribution of cart sizes can be modelled statistically, as explained in more detail below.

Other load variables (not depicted in FIG. 1) include device type, payment type, and guest and registered user distribution. These load variables likewise capture the realistic load on the system. For example, the journey of a registered user accessing the website from his or her mobile device, and paying with Apple Pay will be much different than a guest user who accesses the website from a desktop and paying with Paypal.

The device type load variable reflects the type of device that a user accesses a webpage from. For example, a user can access a webpage from a desktop, smartphone, or tablet. In each case, the web server can detect the type of device being used and deliver a webpage that is optimized for the particular device. The webpage for each device type creates a different amount of load on the web server and system architecture. For example, the webpage optimized for and delivered to a smart phone is smaller in terms of file size than the webpage delivered to a desktop, where a full set of features and content is delivered.

The payment type variable reflects the payment system being used to process a user's payment. Payment systems can include digital wallets that allow third parties to process the payment of a transaction, and can be inserted as a plugin to the code for the checkout process. A digital wallet could be, for example, Masterpass by Mastercard, Paypal, VISA Checkout, AMEX Express Checkout, and similar payment systems. Some payment systems create a larger load on the system than others. For example, a credit card payment form may create more load than a Paypal plugin because the company web server has to verify the credit card information, whereas a Paypal plugin transfers that load onto a different web server (i.e., the Paypal server). Similarly, a user paying via Apple pay may create less load than paying via Masterpass.

The guest and registered user distribution variable reflects the distribution of users that have an account with the company and can login before checking out as compared to the number of users that checkout as a guest user. A registered user that has an account with the system may create more load than a guest because the registered user will login to the system, which creates load by accessing a login identification and verification webpage and by allocating memory to hold user profile information. The login and verification webpage can include authentication and security options that add to the overall load, such as locked or unlocked ID lookup. The user profile information may include the user's order history, address book, payment information, and favorite items. As described above, this profile information can be used to tailor the webpage being viewed by the user. For example, the webpage may show a list of recommended items based on a user's order history or favorites. As another example, the webpage may determine whether there is free shipping, how long it will take to ship, and whether the nearest store has inventory availability based on the default address or address book stored by the user. The queries and logical checks that are used to authenticate a registered user add significant load when compared to a Guest checkout.

The load variables are used by a Workflow Model 102 to generate the input needed for a Script Engine 103. The Script Engine is configured to execute scripts that simulate the internet traffic associated with the given load variable values. For example, given a load variable distribution that is representative of a Black Friday high load scenario, the Script Engine executes scripts that realistically simulate the internet traffic that would be experienced under the load conditions specified by the load variables. In some embodiments, the Script Engine simulates the internet traffic by submitting internet requests to a production mirror. Thus, if for example, the load variables call for 200,000 unique sessions that have a session duration of 5 minutes with 4 page views per session, the Script Engine generates one or more scripts that cause the production mirror to experience 200,000 unique sessions having, on average, a duration of 5 minutes and 4 page views. As another example, the if load variables call for the distributions in Tables 1-4 above, the Script Engine generates one or more scripts that cause the production mirror to experience the session duration distribution, webpage view distribution, think time distribution, and cart size distribution shown in Tables 1-4. The production mirror can comprise the same hardware and software as the production environment so as to ensure that the simulation will realistically replicate the actual internet traffic experienced during a high load scenario.

In some embodiments, the distribution of the internet traffic generated by the Script Engine can conform to statistical models. For example, if the production mirror is to receive 200,000 unique sessions having, on average, a duration of 5 minutes and 4 page views, the duration and page view of each session can be modeled as a bell curve, with the mean set at 5 minutes and 4 pages views. In other embodiments, the distribution of load variables can be fit to other probability density functions, such as a Poisson, polynomial, quadratic, binomial, Gamma, Beta, Chi-Squared, HyperGeometric, or similar curve. Each of the load variables above that can be expressed as distributions can be modelled to fit probability density functions.

In some embodiments of the invention, an Analytics Engine 104 can be used to provide the distributions of the load variables. The Analytics Engine can be configured to store historical data collected on each load variable from previous high load events. For example, the number of user sessions, think time distributions, entry distributions, cart size distributions, and session duration distributions from last year's Black Friday can be monitored, collected, and then stored in an Analytics Engine. The Analytics Engine can then provide the Workflow Model with historical load variable distributions for each load variable. In some embodiments, the Analytics Engine generates the distribution of values for each of the one or more load variables by determining a worst-case scenario value of the variable from the historical load data.

In some embodiments, the Analytics Engine can generate a statistical model that is fit to the historical load data. For example, one of the probability density functions described above, such as a Bell, Poisson, binomial, Gamma, Beta, Chi-Squared, HyperGeometric, or similar curve, can be used to model the distribution.

In some embodiments, the Analytics Engine can be configured to execute machine learning classifiers to extrapolate patterns in the historical load data and predict distributions for future high load events based on historical load data and the patterns discerned by the machine learning classifiers.

In order to create the internet traffic that corresponds to the high load event that is specified by the high load variables, a Load Test Controller 105 executes parallel user threads using Load Generators 106. The Load Test Controller 105 controls the Load Generators 106 by determining a number of parallel user threads that are available and the request pacing, and by retrieving data setups that represent the internet traffic of each user. The Load Generators will, on aggregate, exhibit the characteristics of the high load scenario specified by the high load variables.

For example, a high load scenario may call for 200,000 unique sessions that have an average session duration of 5 minutes with an average of 4 page views per session, and the session duration distribution, webpage view distribution, think time distribution, and cart size distribution shown in Tables 1-4. In this scenario, the Load Test Controller first determines the appropriate number of parallel threads to run. In some embodiments, this is determined based on the available capacity of the servers and infrastructure. For example, a server may only be able to process a maximum of 40 threads in parallel at a time. If the scenario calls for executing more than the maximum number of threads that can be run, the Load Test Controller can use thread pools and other multi-threading management modules to compensate and execute the simulation. The Load Test Controller can also allocate additional CPUs or additional servers to increase its capacity for more threads.

The Load Test Controller can execute the threads using a Load Generator 106. In some embodiments, each Load Generator can run a process that spawns the threads. When two or more Load Generators execute processes in parallel, each process can spawn threads that will also run in parallel and independently of each other. In this way, the Load Test Controller and Load Generators can simulate the effect of multiple users submitting webpage requests to the website at the same time.

In some embodiments, the threads can be operating system threads that are managed by a scheduler of the operating system and are capable of executing in parallel. Other programming paradigms that facilitate concurrency can be used. For example, Python asyncio, which is a single-threaded single-process design, can be used to create the effect of concurrency. Asyncio allows for code to be flagged and called in an asynchronous manner. Asynchronous routines can be paused until they receive a result, during which other routines can execute in the meantime.

Each thread is associated with a data setup as described below that specifies which webpages the thread will navigate to. The Load Test Controller 105 then controls how much time each thread takes as it navigates through webpages, creating a realistic simulation of a user's journey through a website.

In some embodiments, the Load Test Controller 105 can also control the request spacing, which spaces the execution of the threads apart so that they do not execute all at once.

This enables the Load Test Controller 105 to realistically simulate the ebb and flow of internet traffic during a specific time period.

Figure 2:
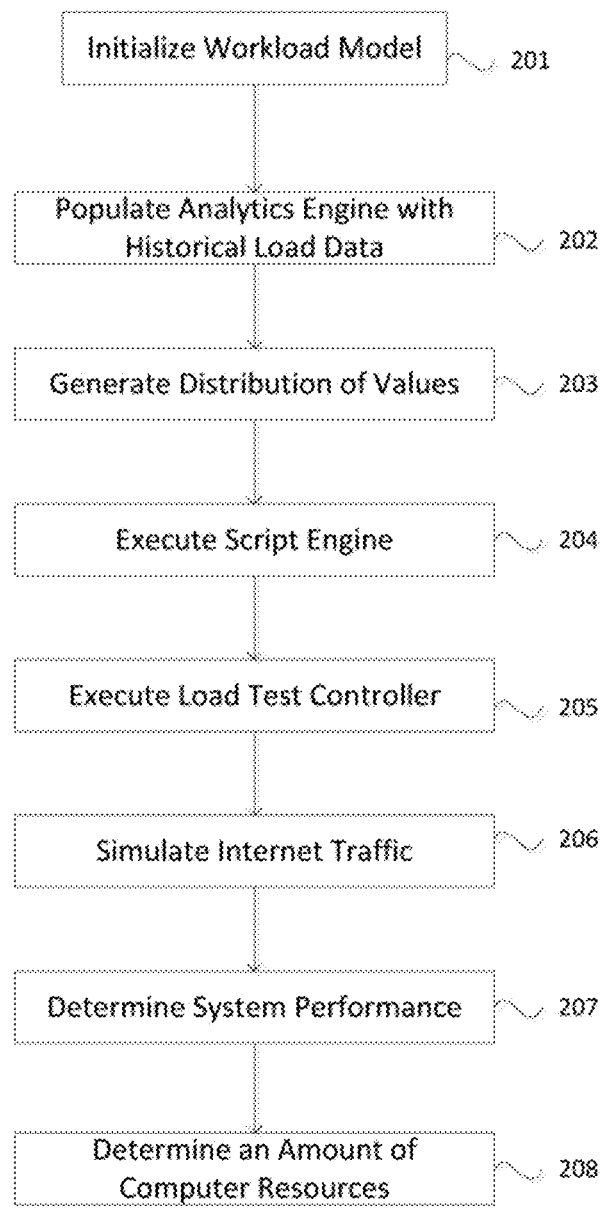
FIG. 2 shows an exemplary method for optimizing system performance of a website during a high load scenario using testing scripts according to embodiments of the invention.

An exemplary method for optimizing system performance of a website during a high load scenario using the Load Test Controller, Load Generators, Script Engine, Workload Model and Analytics Engine is shown in FIG. 2. In some embodiments, the method begins in step 201 by initializing a Workload Model. As explained above, the Workload Model includes the high load variables, and rules and logic that interrelate the high load variables to recreate a high load scenario. In step 202, the Analytics Engine is populated with historical load data. As described above, historical data collected on each load variable from previous high load events can be used to populate the Analytics Engine. In step 203, a distribution of values for each load variable can be generated. As described above, the distribution can be generated by, for example, using the same values from past high load events, by determining worst-case scenario values, or by using statistical models. In step 204, the Script Engine executes to generate input for the Load Test Controller. In step 205, the Load Test Controller executes, which as described above, determines how to control one or more Load Generators. In step 206, the internet traffic of the high load scenario is simulated with the one or more Load Generators. As described above, the Load Generators execute processes that may spawn parallel threads which request webpages from the website, thereby simulating the internet traffic of multiple users. In step 207, the performance of the system in response to the simulated traffic is measured. As described in more detail below, the system performance measurement can be provided as a Performance Output to a system analyst or administrator. Based on the Performance Output, a decision can be made to reallocate or adjust computer resources, as shown in step 208. As described in more detail below, the reallocation or adjustment of resources can include using a load balancer to balance computer resources to meet the demands of a high load scenario.

Figure 4A:
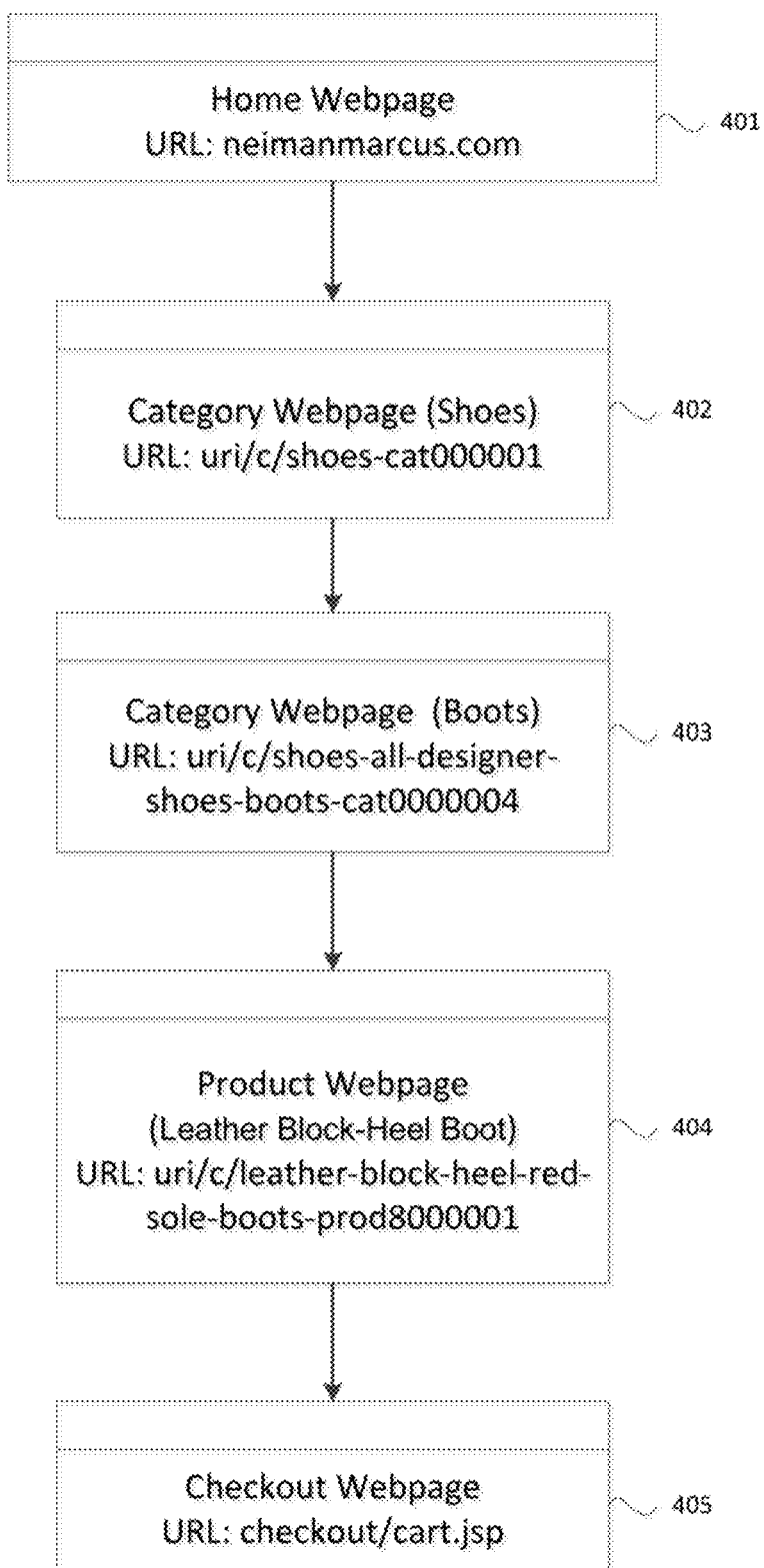
FIGS. 4A-4B show exemplary data setups used in optimizing system performance of a website during a high load scenario using testing scripts according to embodiments of the invention.

The data setup describes the user's journey during their session in that it specifies the different webpages that a user would navigate to and their sequence during a session. An exemplary data setup according to some embodiments is depicted in FIG. 4A, and shows a user may begin their journey by navigating to the website Home Webpage 401. This starting point of the user's journey may be based on the entry distribution load variable described above. If the entry distribution load variable calls for 80% of the entry points on a particular high load event to be Home Webpages, then 80% of the starting points in the data setups will be a Home Webpage.

A user may then browse to a particular Product Category Webpage (in this case, shoes) 402, then navigate to a particular Product Sub-Category (boots) Webpage 403, selecting a specific product that takes them to a Product Webpage (for the Leather Block-Heel Boot) 404, before finally proceeding to a Checkout Webpage 405.

Figure 4B:
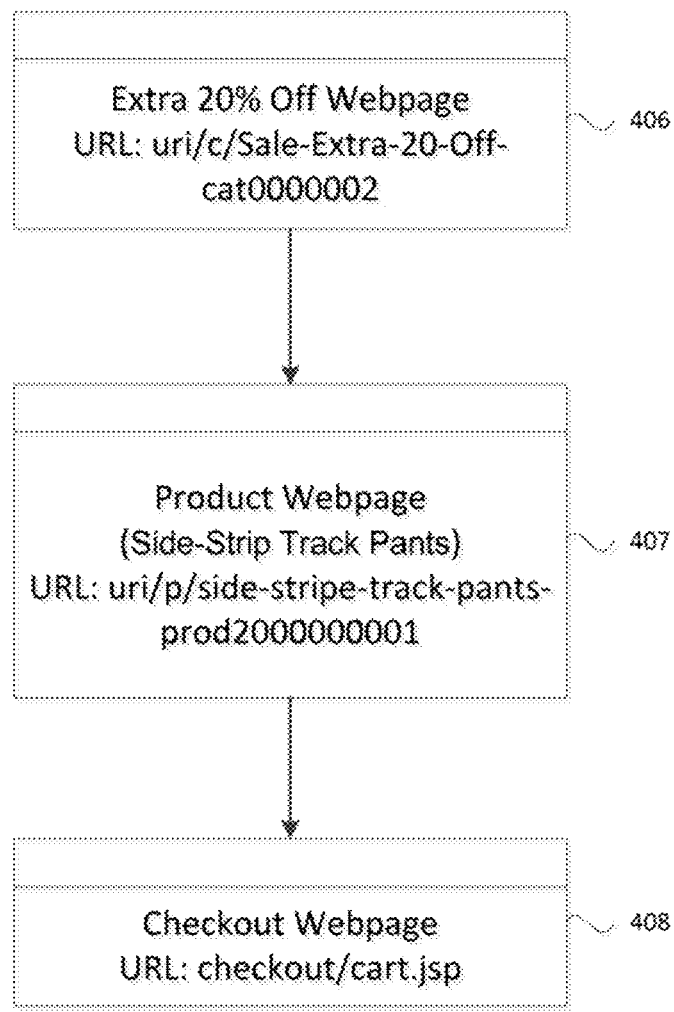

Another exemplary data setup according to some embodiments is depicted in FIG. 4B, and shows a user who may have received a link to a sales promotion. The data setup in FIG. 4B shows the user initiating the journey by navigating directly to the Sales Webpage (for an extra 20% off) 406, selecting a particular product to take them to a Product Webpage (for Side-Strip Track Pants) 407, before proceeding to a Checkout Webpage 408.

The Sales Webpage 406 and Product Webpage 407 may cause more load on the system than a Product Webpage that otherwise has no promotion. For example, determining the discounts and sales that are applicable to a product can require executing promotion eligibility rules which may cause stress at the Application Layer and retrieving and storing information from a database, causing load at the Data Layer. The difference in loads caused by the promotion's added stress on the Data Layer is one of the reasons why the data setup of FIG. 4A will have a different total load on the system than the data setup of FIG. 4B. Another reason the loads are different is because the data setup of FIG. 4A requests more total webpages overall, and of those webpages, FIG. 4A requests more Category Webpages, which as described above cause more load. One benefit of having different data setups creating different loads on the system is that it recreates the reality that each user journey causes a different load on the system. As a result, when aggregating all the data setups as a whole, the simulated internet traffic realistically represents the variety of webpages that are requested during a high load scenario and the corresponding load that it creates.

In some embodiments, the URLs are chosen based on historical load data to accurately simulate the webpages that were requested in the past. For example, the data setup shown in FIG. 4B can be based off of historical data that was recorded from real-world past events. Thus, the data setup shown in FIG. 4B can be an actual user journey from the same sales promotion that was offered last year, thereby providing a realistic representation of a user journey responding to a particular sales promotion or event. Each thread in the simulation can be associated with a data setup that is based off of a historical high load event, thereby simulating how webpages were requested by users in past high load events.

Figure 5:
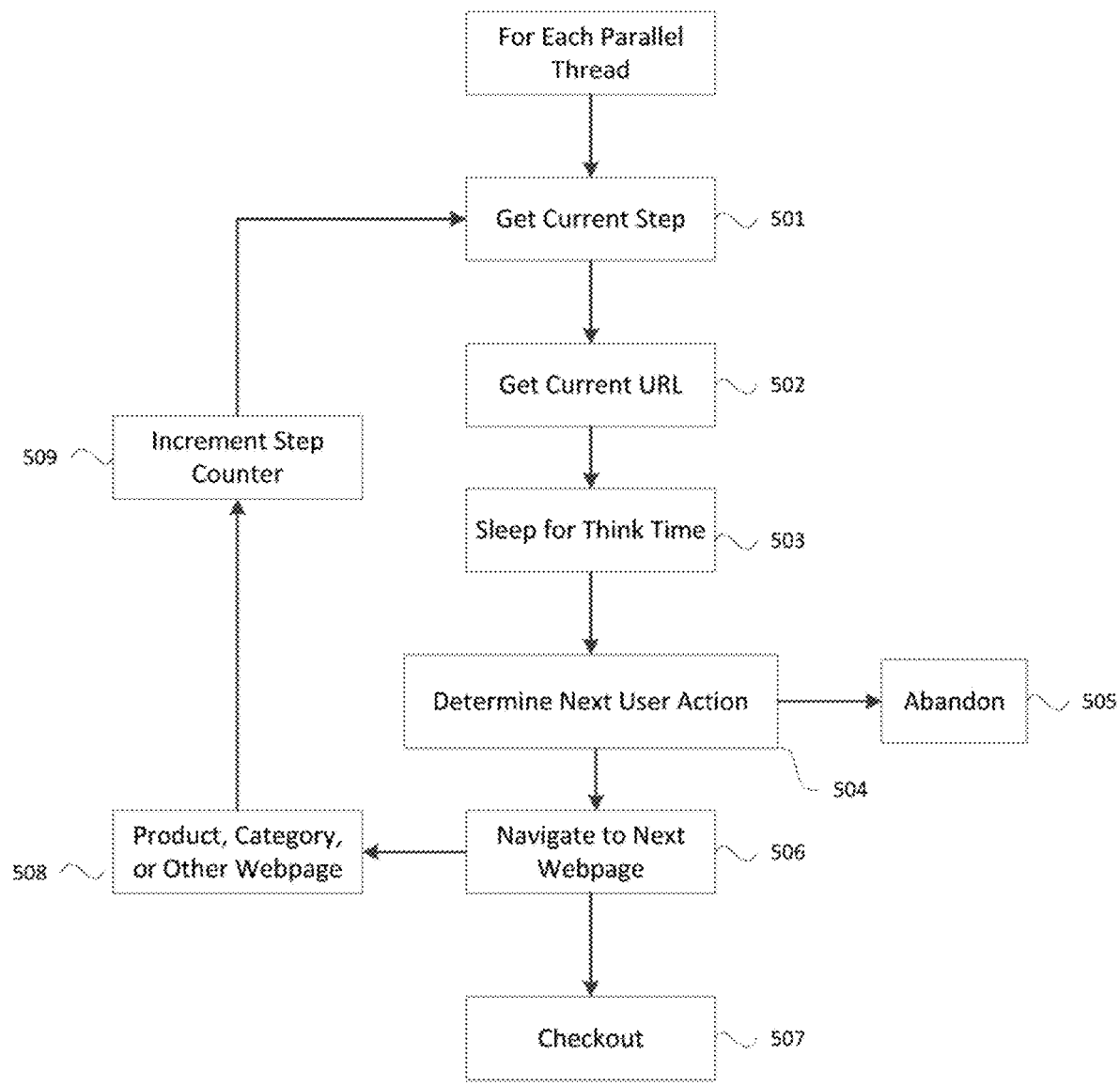
FIG. 5 illustrates how each thread incorporates other high load variables according to embodiments of the invention.

FIG. 5 illustrates how each thread incorporates other high load variables described above to realistically simulate a user's interaction with each webpage according to some embodiments. As shown in FIG. 5A, each thread executes by first determining the current step in the data setup 501. The step represents the current stage of a user's journey. For example, in the data setup shown in FIG. 4A, the first step corresponds to the Home webpage that the user navigates to at the beginning of the journey, and the second step corresponds to the Category webpage. The URL for the current step is then retrieved from the data setup in 502. For example, if the current step were the first step of FIG. 4A, the URL would be neimanmarcus.com. The thread then submits a request to the website for the URL (e.g., neimanmarcus.com), thereby simulating the real internet traffic of the first step of a user's journey through the website.

The process then retrieves the think time load variable that corresponds to the user's think time for the current webpage 503. As described above, a user's think time for one particular webpage (e.g., a Product Category webpage) may differ from another webpage (e.g., a Product Detail webpage), which can impact the overall load to the system differently. The process then causes the thread to sleep for the amount of time equal to the think time. As described above, the think time represents the amount of time that a user will dwell on a particular webpage. Thus, by causing the thread to sleep for the think time, the process realistically simulates how long the user is viewing the current webpage.

The process then determines the next user action 504. In some embodiments, the next user action can include a decision to add a product to the user's shopping cart or not. As described above, the decision to add the product to the shopping cart can be based off of historical data or the cart size distribution load variable. For example, if the cart size distribution calls for a cart size of 2 items, the process can add items to the shopping cart depending on how many items have already been added. In some embodiments, the cart size distribution can be expressed as a probability, such as for example, 35%, and the decision to add the item can be made using mathematical libraries that use the probability. As another example, the process can add a specific product to the shopping cart if a user taking the same journey in the past decided to do so. The decision can also be made based on machine learning algorithms applied to the historical data.

In some embodiments, the next user action further includes the option of either abandoning the journey altogether 505, or navigating to another webpage 506. Abandoning the journey 505 realistically simulates the scenario where a user decides to leave the website without making any purchases. Navigating to the next webpage in 506 realistically simulates scenarios where users continue navigating to other webpages 508 on the website. For example, after requesting the webpage for the URL corresponding to the first step of the data setup in FIG. 4A, the process determines that the next step in the journey is to navigate to another webpage (i.e., Category Webpage).

The other webpages can also be a Search, View Shopping Bag, or Login webpage. The type of webpage the user navigates to next can be based off of historical data or the webpage view distribution load variable. For example, if the webpage view distribution calls for a View Shopping Bag page, the process can navigate next to a View Shopping Bag webpage. In some embodiments, the webpage view distribution can be expressed as a probability, such as for example, 35%, and the next webpage chosen can be determined using mathematical libraries that use the probability. As another example, the next webpage can follow the same journey that a user took in the past. The decision can also be made based on machine learning algorithms applied to the historical data.

If the process navigates to other webpages 508, the process increments the step counter and repeats the process at 501. Thus, after completing the first step for FIG. 4A, the step counter is incremented to 2. The URL for the second step is then retrieved from the data setup, which is the URL for the category webpage (e.g., uri/c/shoes-cat000001). The process then again determines whether to continue navigating to the next webpage, or to abandon the journey.

Navigating to the next webpage in 506 can also include checking out 507 as shown in FIG. 4A as 405. The checkout webpage 507 simulates the checkout process, and as described above, can be completed using one of several payment methods (e.g., PayPal or Masterpass).

Each thread is executed by a Load Generator 107, which is controlled by the Load Test Controller 105. When each Load Generator executes a thread, it submits requests to a production mirror website and exhibits the characteristics that were associated with it by the Load Test Controller, thereby simulating the internet traffic of each visitor. For example, one thread may submit requests to the webpages specified by the data setup in FIG. 4A (e.g., the Home Webpage, the Category Webpages, the Product Webpages, and the Checkout Webpage). The session duration created by the thread can be 6 minutes and views 4 different pages, where the 4 different webpages are those that were specified by the Data Setup. When the Load Generators are aggregated on a whole, they simulate the desired internet traffic of 200,000 visitors as specified by the high load variable distributions that characterize a high load event. For example, the average session duration and page views across all threads can be 5 minutes and 4 page views, and they have the session duration distribution, webpage view distribution, think time distribution, and cart size distribution shown in Tables 1-4.

In some embodiments, the Load Test Controller further includes inputs that allow for the manipulation of the Load Generators, including start/stop execution, spin up/spin down load generators, collection of performance data, display of Performance Output, and managing Load Distribution.

Figure 6A:
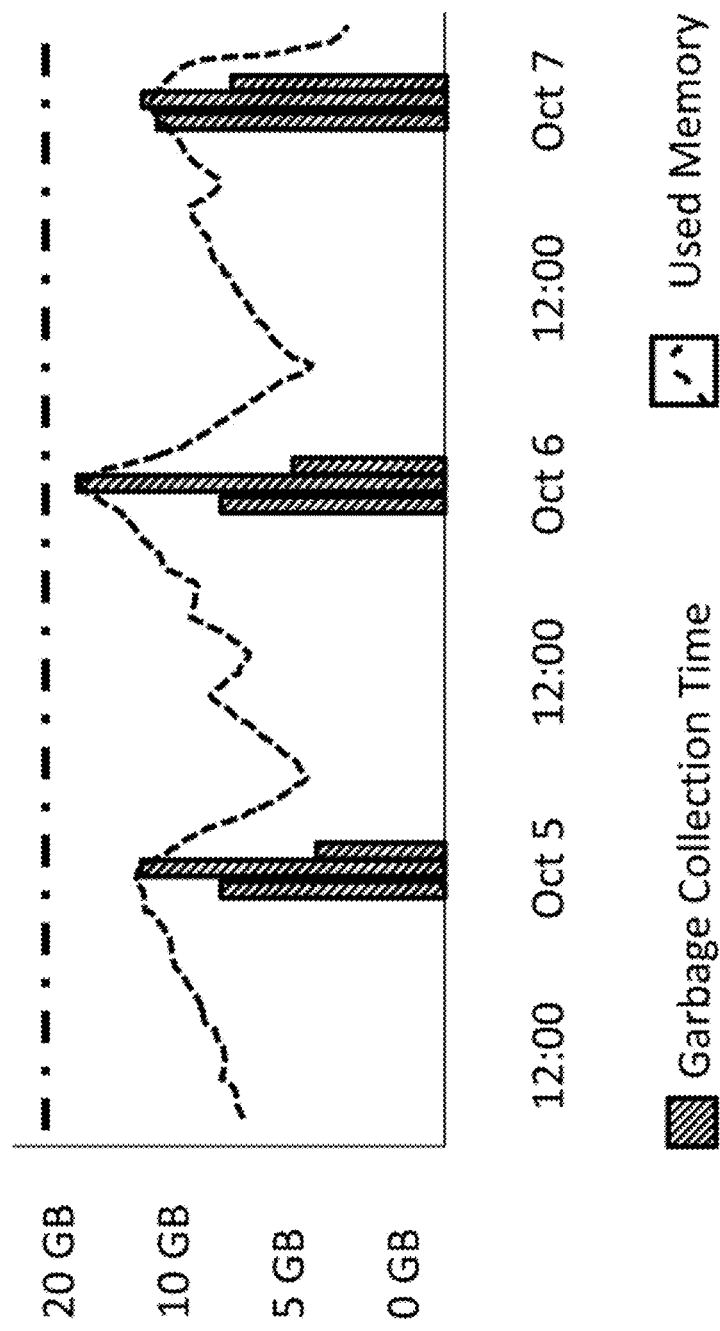
Figure 6B:
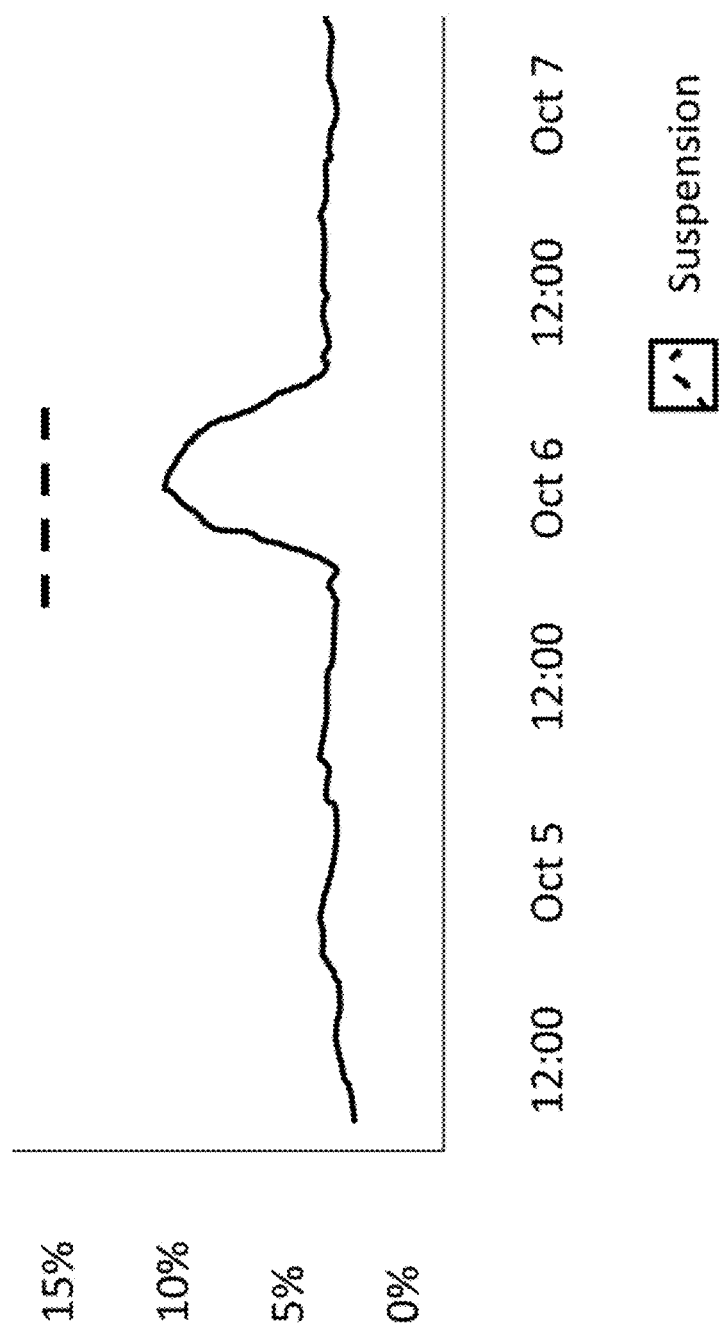

In some embodiments, the Load Test Controller can provide Performance Output of one or more performance measures of the system during the simulated high load event. The performance measures can include, for example, virtual machine metrics that capture memory usage as shown on FIG. 6A or suspension as shown in FIG. 6B. As another example, the performance measures can include the chart shown on FIG. 6B, which shows Error Percentage, Throughput, CPU(Host), and Memory(Host) for different load tests performed on three different days.

In some embodiments, the performance of the production mirror is evaluated by the Load Test Controller. The one or more performance measures can be provided as part of a file that includes a comprehensive report, or it can be provided on an interactive display for a system analyst or administrator to view. The report or display can associate each performance load test with a time and build information for the code. For example, a performance load test can be associated with a particular release, branch and check point of code, so that if a system analyst identifies a bug in the code, they can pinpoint the version of code infected with the bug.

Reviewing the performance measures enables system analysts or administrators to identify memory leaks and similar problems with the systems that may be caused by software bugs. For example, in FIGS. 6A and 6B, system analysts can identify that there was a high suspension and long running garbage collection for a short duration. The system analyst can correlate the timing of this behavior with certain messages or functions being executed, revealing which code modules or services have a memory leak or bug. In this way, conducting the high load performance tests allows system analysts to identify and eliminate code bugs and other malfunctions that arise during high load scenarios that may otherwise be unnoticeable during regular load operations. For example, conducting a high load performance test before a holiday allows system analysts to prevent bugs that may otherwise cause costly downtime. In some embodiments, the system analysts can correlate the performance measures with logs, printouts of the memory heap, chronological traces of the memory stack, or similar snapshots of the memory or stack.

Figure 6D:
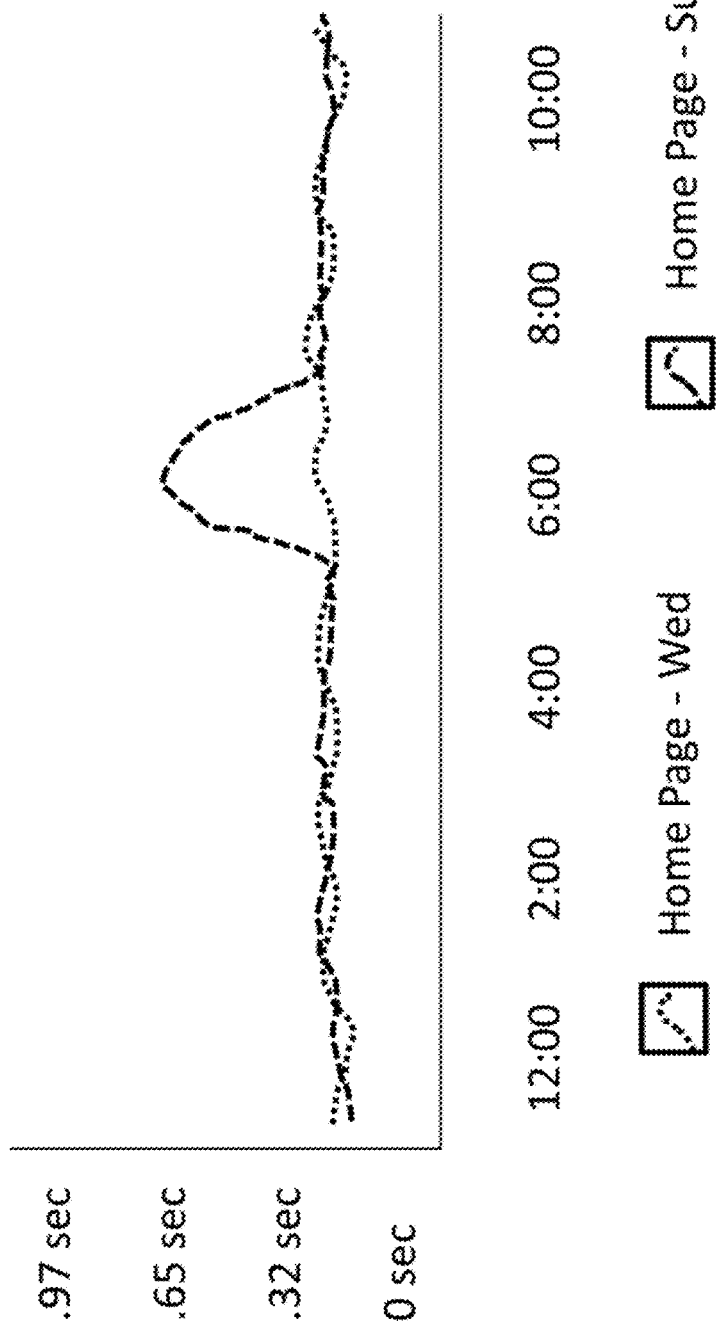

In some embodiments, the performance measures can show statistics about a particular webpage's performance on different dates, in order to identify anomalous behavior. For example, as shown in FIG. 6D, the average garbage collection time for the Home Webpage is shown for Wednesday and Sunday. As FIG. 6D shows, the average garbage collection time for Sunday spiked around 6:00, indicating a bug in the code's management of memory. A similar output can be provided for server response times, as shown in FIG. 6E. As FIG. 6E shows, server response times spiked on Sunday between 12:00 and 2:00, indicating a problem in the network layer.

Performance output comparisons can be generated for different webpages (e.g., Product Category webpages, Search webpages, etc.). They can also track different metrics, such as HTTP error rates, CPU memory consumption, java heap memory size, median request time, timeouts, the number of pages being returned in each request (or its average or median), read capacity, and similar metrics.

In some embodiments, the high load scenario runs for a timeframe that comprises one or more time periods, and the amount of computer resources needed to meet the high load scenario based on the determined system performance is determined for each time period. The time periods can be, for example, one hour in length. In some embodiments, the high load scenario is an endurance test such that the timeframe comprises 8 time periods.

In such endurance tests, the performance results can be evaluated to identify memory leaks in the web servers or system architectures. A memory leak can occur when, for example, objects are allocated in memory but are no longer being used by a software application, and a garbage collector is unable to remove them from working memory. This may happen because, for example, the objects are still being referenced by something in the software application even though they are not being used. As a result, the software application can continue to consume computer resources until it leads to a fatal error, such as an OutOfMemoryError.

In some embodiments, a load balancer is used to balance computer resources based on the determination of computer resources needed to meet the high load scenario. For example, if it is determined that additional computer resources may be needed to serve webpages that are expected to receive high loads, the load balancer facilitates the allocation of additional computer resources. In some embodiments, the load balancer balances loads by appropriately scaling cloud services that provide the function being requested. For example, the cloud service can be an Amazon EC2 service, and the load balancer can scale the service by adding capacity. In some embodiments, the performance output can display the status of each service including the number of desired tasks compared to the number of running tasks. For example, as shown in FIG. 6F, an analyst can review the services and determine additional virtual machines are needed to scale up the number services that are being provided. In some embodiments, the performance output can display the failure rates for different services, as shown in FIG. 6G, further allowing the analyst to make decisions about balancing or scaling the services.

The embodiments described in this disclosure can be combined in various ways. Any aspect or feature that is described for one embodiment can be incorporated into any other embodiment mentioned in this disclosure. Moreover, any of the embodiments described herein may be hardware-based, software-based and/or comprise a mixture of both hardware and software elements. Accordingly, while various novel features of the inventive principles have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps of any described methods may be carried out in different orders in many cases where such may be appropriate. Those skilled in the art will recognize, based on the above disclosure and an understanding therefrom of the teachings of the inventive principles, that the particular hardware and devices that are part of the system described herein, and the general functionality provided by and incorporated therein, may vary in different embodiments of the inventive principles. Accordingly, the particular system components are for illustrative purposes to facilitate a full and complete understanding and appreciation of the various aspects and functionality of particular embodiments of the present principles as realized in system and method embodiments thereof. Those skilled in the art will appreciate that the inventive principles can be practiced in other than the described embodiments, which are presented for purposes of illustration and not limitation.

The invention claimed is:

1. A method for optimizing system performance of a user facing web application during a high load scenario, the method comprising:
    initializing a workload model of a website, the workload model including one or more load variables;
    generating a respective distribution of values for each respective load variable of the one or more load variables, the one or more load variables comprising at least one session duration load variable simulating one or more asynchronously requesting webpage elements running on a webpage of the website;
    executing a script engine using at least a portion of the respective distribution of values for each respective load variable of the one or more load variables, wherein the script engine generates input for a load test controller;
    executing the load test controller configured to control one or more load generators;
    simulating internet traffic to the website with the one or more load generators;
    determining the system performance based on the internet traffic to the website, as simulated; and
    determining an amount of computer resources needed to meet the high load scenario based on the system performance, as determined, wherein:
        the distribution of values for each of the one or more load variables is generated using an analytics engine that simulates the high load scenario using historical load data;
        the one or more asynchronously requesting webpage elements running on the webpage of the website comprise one or more real time interactive plugins running on the webpage of the website;
        the one or more real time interactive plugins running on the webpage of the website comprise one or more of:
            a product alert plugin running on a shopping cart webpage of the website; or
            a validation plugin running on a payment webpage of the website.

2. The method of claim 1, wherein the one or more load variables further comprise one or more of:
    i) at least one number of user sessions load variable;
    ii) at least one think time load variable;
    iii) at least one cart size distribution load variable;
    iv) at least one entry distribution load variable; or
    v) at least one guest and registered user distribution load variable.

3. The method of claim 1, wherein the load test controller controls the one or more load generators based on:
    i) one or more user threads;
    ii) request pacing comprising a number of requests per period of time; and
    iii) data setups for each of the one or more user threads.

4. The method of claim 1, wherein simulating the internet traffic to the website comprises simulating the internet traffic experienced by the website during a predetermined event.

5. The method of claim 1, wherein the historical load data is populated by recording samples of the one or more load variables during past events.

6. The method of claim 1, wherein the analytics engine generates the respective distribution of values for each respective load variable of the one or more load variables by determining a respective worst-case scenario value of the respective load variable from the historical load data.

7. The method of claim 1, wherein the analytics engine generates the respective distribution of values for each respective load variable of the one or more load variables using a machine learning classifier.

8. The method of claim 1, wherein the one or more load generators simulate the internet traffic by submitting internet requests to a production mirror.

9. The method of claim 1 further comprising:
displaying the system performance with the load test controller.

10. The method of claim 1, wherein determining the system performance comprises:
measuring website response times with the load test controller.

11. The method of claim 1, wherein:
the high load scenario runs for a timeframe that comprises one or more time periods; and
the amount of computer resources needed to meet the high load scenario is based on the system performance, as determined for each respective time period of the one or more time periods.

12. The method of claim 11, wherein:
the high load scenario comprises an endurance test;
the timeframe comprises at least eight time periods; and
the method further comprises identifying memory leaks based on the system performance, as determined for each respective time period of the at least eight time periods.

13. The method of claim 1, further comprising:
balancing the computer resources using a load balancer based on the amount of the computer resources needed to meet the high load scenario, as determined.

14. The method of claim 13, wherein the load balancer allocates additional computer resources to serve webpages of the website that are estimated to receive high loads.

15. A system comprising:
one or more processors; and
one or more non-transitory computer-readable storage devices storing computing instructions configured to run on the one or more processors and perform acts of:
initializing a workload model of a website, the workload model including one or more load variables;
generating a respective distribution of values for each respective load variable of the one or more load variables, the one or more load variables comprising at least one session duration load variable simulating one or more asynchronously requesting webpage elements running on a webpage of the website;
executing a script engine using at least a portion of the respective distribution of values for each respective load variable of the one or more load variables, wherein the script engine generates input for a load test controller;
executing the load test controller configured to control one or more load generators;
simulating internet traffic to the website with the one or more load generators;
determining the system performance based on the internet traffic to the website, as simulated; and
determining an amount of computer resources needed to meet the high load scenario based on the system performance, as determined, wherein:
the distribution of values for each of the one or more load variables is generated using an analytics engine that simulates the high load scenario using historical load data;
the one or more asynchronously requesting webpage elements running on the webpage of the website comprise one or more real time interactive plugins running on the webpage of the website; and
the one or more real time interactive plugins running on the webpage of the website comprise one or more of:
a product alert plugin running on a shopping cart webpage of the website; or
a validation plugin running on a payment webpage of the website.

16. The system of claim 15, wherein the one or more load variables further comprise:
i) at least one number of user sessions load variable;
ii) at least one think time load variable;
iii) at least one cart size distribution load variable;
iv at least one entry distribution load variable; and
v) at least one guest and registered user distribution load variable.

17. The system of claim 15, wherein the load test controller controls the one or more load generators based on:
i) one or more user threads;
ii) request pacing; and
iii) data setups for each of the one or more user threads.

18. The system of claim 15, wherein simulating the internet traffic to the website comprises simulating the internet traffic experienced by the website during a predetermined event.

19. The system of claim 15, wherein the historical load data is populated by recording samples of the one or more load variables during past events.

20. The system of claim 1, wherein the one or more real time interactive plugins running on the webpage of the website further comprises:
a chat plugin running on a product webpage of the website.

* * * * *